United States Patent

[11] 3,594,794

| [72] | Inventor | Howard S. Halpern<br>Stamford, Conn. |
|---|---|---|
| [21] | Appl. No. | 836,495 |
| [22] | Filed | June 25, 1969 |
| [45] | Patented | July 20, 1971 |
| [73] | Assignee | United Aircraft Corporation<br>East Hartford, Conn. |

[54] RADAR TARGET DETECTION DEVICE
10 Claims, 1 Drawing Fig.

[52] U.S. Cl. .................................................. 343/11,
343/16, 343/17.1
[51] Int. Cl. .................................................. G01s 9/06
[50] Field of Search ............................... 343/11, 16,
17.1

[56] References Cited
UNITED STATES PATENTS
3,072,855  1/1963  Chandler ..................... 343/17.1 X
3,157,875  11/1964  Matsukasa et al. .......... 343/17.1 X
3,480,957  11/1969  Kosowsky ..................... 343/16

Primary Examiner—Rodney D. Bennett, Jr.
Assistant Examiner—T. H. Tubbesing
Attorney—Shenier & O'Connor ABSTRACT: Clutter discrimination is effected in a phase interferometer radar system by varying the transmitted frequency, detecting resultant fluctuations from the mean elevation angle of return within a large number of range intervals, extracting the average fluctuation over a small number of range intervals, determining those range intervals for which the instantaneous fluctuation is less than the average fluctuation, and correlating the range intervals determined over a plurality of transmitted pulses to select any range interval consistantly providing relatively smaller fluctuations in apparent elevation angle and hence containing some radar target. The selected range interval may further be correlated over a plurality of azimuthal scans to provide additional discrimination.

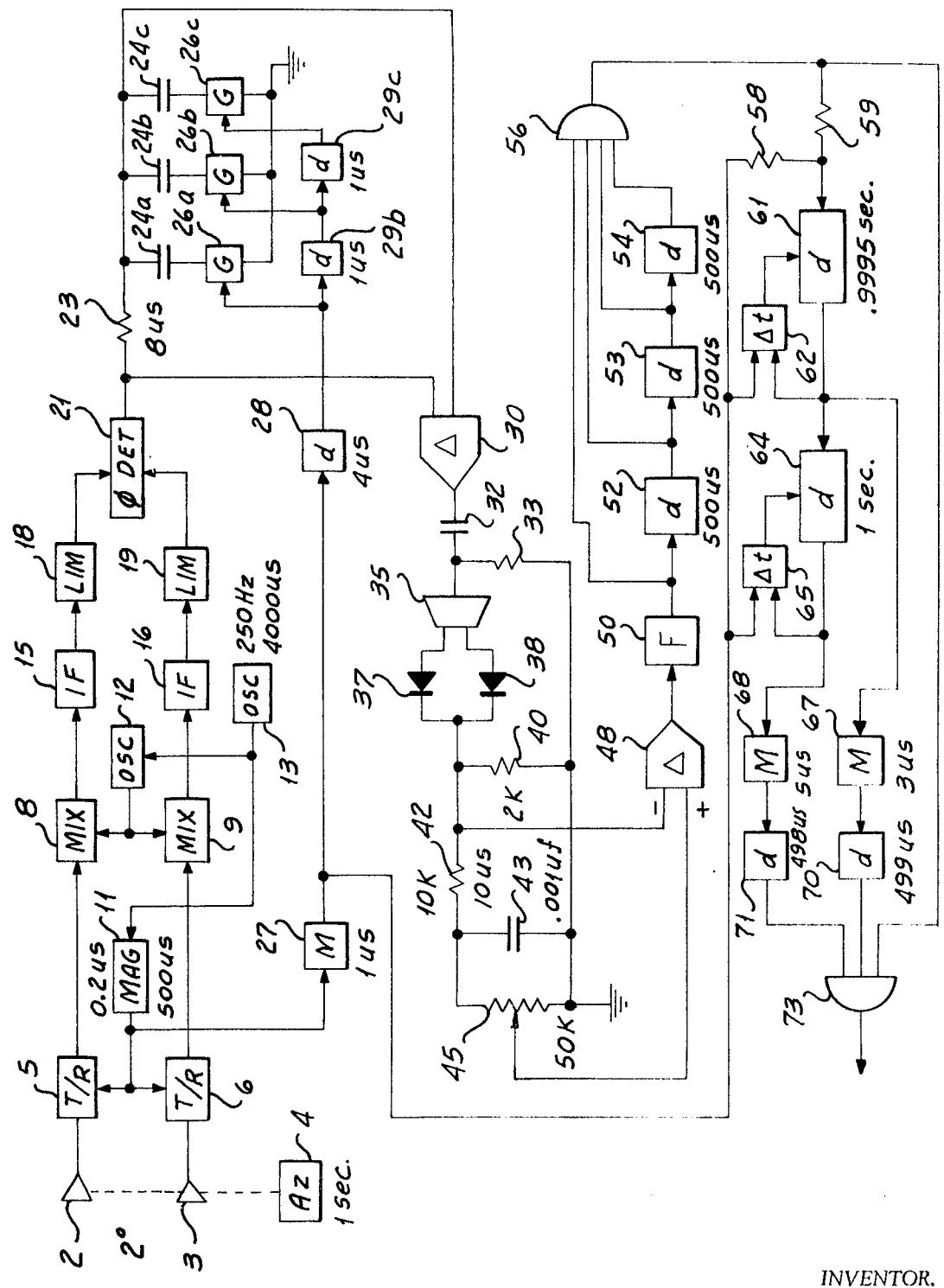

RADAR TARGET DETECTION DEVICE

SUMMARY OF THE INVENTION

One object of my invention is to provide a phase interferometer radar system in which discrimination against clutter is effected by sensing fluctuations from the mean elevation angle of return within a large number of range intervals.

Another object of my invention is to determine those range intervals providing relatively small fluctuations which indicate the existence of a radar target.

A further object of my invention is to correlate the determined intervals from pulse to pulse and from scan to scan to select those range intervals consistently providing relatively small fluctuations.

Other and further objects of my invention will appear from the following description.

BRIEF DESCRIPTION OF THE DRAWING

The accompanying drawing, which forms part of the instant specification and is to be read in conjunction therewith, is a schematic view illustrating a preferred embodiment of my invention.

DESCRIPTION OF THE PREFERRED EMBODIMENT

Referring now more particularly to the drawing, a pair of vertically spaced antennas 2 and 3 each having a narrow azimuthal pattern of 2° and a broad vertical pattern of 90° are concomitantly rotated in azimuth by a synchronous motor 4 at the rate of 1 revolution per second. Antennas 2 and 3 are coupled to respective transmit-receive devices 5 and 6. The outputs of devices 5 and 6 are coupled to respective mixers 8 and 9. Devices 5 and 6 are driven by a magnetron 11 providing output pulses of 0.2 microsecond duration with a period between pulses of 500 $\mu$sec. Mixers 8 and 9 are supplied by a local oscillator 12. The intermediate frequency outputs of mixers 8 and 9 are coupled to respective amplifiers 15 and 16. The output frequency of magnetron 11 is varied about a nominal center frequency by a 250 Hertz oscillator 13. The output frequency of local oscillator 12 is also synchronously varied by the output of oscillator 13 to maintain the intermediate frequency output of mixers 8 and 9 constant. The outputs of intermediate frequency amplifiers 15 and 16 are coupled to respective limiters 18 and 19, the outputs of which are impressed upon a divide-by-four phase detector 21. The output of phase detector 21 is coupled through a resistor 23 to a plurality of range-gated filter capacitors 24a, 24b, and 24c which are selectively grounded through respective gates 26a, 26b, and 26c. The time-constant of resistor 23 and each of the identical capacitors 24a through 24c may conveniently be 8 $\mu$sec.

The output of magnetron 11 is coupled to a monostable multivibrator 27 which provides output pulses of 1 $\mu$sec. duration. The output of multivibrator 27 is coupled through network 28, which provides a time delay of 4 $\mu$sec., to the control input of gate 26a. The output of delay network 28 is coupled through a network 29b, which provides a time delay of 1 $\mu$sec., to the control input of gate 26b. The output of network 29b is coupled through a network 29c, which provides a time delay of 1 $\mu$sec., to the control input of 26c. Network 28 provides a somewhat longer time delay so as to correspond to the recovery time of transmit-receive devices 5 and 6. Since there are 500 $\mu$sec. between transmitted pulses, and since the range-gating interval is 1 $\mu$sec., there are provided some 493 additional capacitors 24, gates 26, and delay networks 29 (not shown) so as to produce a total of 496 range-gated intervals.

The output of phase detector 21 and the output of the range-gated filter are coupled to a differential amplifier 30. The output of differential amplifier 30 is coupled through a high pass filter, comprising series capacitor 32 and shunt resistor 33, to the input of a balanced, direct-current, phase-splitting amplifier 35. The two outputs of amplifier 35 are coupled forwardly through respective rectifiers 37 and 38 to one terminal of 2K resistor 40, the other terminal of which is grounded. The full-wave rectified output across resistor 40 is coupled to a low-pass filter comprising a 10K series resistor 42 and a 0.001 $\mu$f. shunt capacitor 43. The time-constant of the low-pass filter is 10 $\mu$sec. Capacitor 43 is shunted by a 50K potentiometer 45.

The slider of potentiometer 45 is coupled to the positive input of differential amplifier 48; and the output across resistor 40 is coupled to the negative input thereof. The output of differential amplifier 48 drives a flip-flop 50. The output of flip-flop 50 is serially coupled through respective 500 $\mu$sec. delay networks 52, 53, and 54 to one input of AND circuit 56, which is supplied with further inputs from the outputs of flip-flop 50 and delay networks 52 and 53.

The outputs of multivibrator 27 and AND circuit 56 are coupled through respective summing resistors 58 and 59 to the input of controllable network 61 providing a nominal time delay of 0.9995 second. The outputs of network 61 and multivibrator 27 are coupled to a pulse time comparison circuit 62, which provides an output proportional in both magnitude and polarity to any lack of synchronism between pulses applied at its two inputs. The output of comparison circuit 62 adjusts the precise time delay provided by network 61. The output of network 61 is coupled to a controllable network 64 which provides a nominal time delay of 1 second. The outputs of network 64 and multivibrator 27 are coupled to a pulse time comparison circuit 65, which functions in a manner similar to circuit 62. The output of comparison circuit 65 adjusts the precise time delay provided by network 64.

The output of delay network 61 is coupled to a monostable multivibrator 67 providing output pulses of 3 $\mu$sec. duration which are applied to a 499 $\mu$sec. delay network 70. The output of delay network 64 is coupled to a monostable multivibrator 68 providing output pulses of 5 $\mu$sec. duration which are applied to a 498 $\mu$sec. delay network 71. The outputs of AND circuit 56 and delay networks 70 and 71 are coupled to an AND circuit 73. AND circuit 73 provides an output indicating the existence of a radar target which persists for four successive pulses during each of three successive azimuthal scans.

In operation of my invention, upon each transmitted pulse for magnetron 11, energy is channeled through devices 5 and 6 and radiated from antennas 2 and 3 to illuminate terrain along a given range line. Radar return from the terrain is received by antennas 2 and 3 with a resulting relative phase shift depending upon the elevation angle of the instantaneous center of return. Phase detector 21 measures the phase shift between signals received by antennas 2 and 3 and provides an output indicating the elevation angle of the instantaneous center of return. Each range-gated filter capacitor 24 stores the mean elevation angle of terrain in an area which is approximately 500 feet in length and 2° in width. Since the magnetron pulses has a duration of only 0.2 $\mu$sec., the instantaneous return is from a ground patch approximately 100 feet in length and 2° in width. Such patch of terrain will contain a large number of individual scatterers. The measured elevation angle of this terrain patch is the sum of the signals received from the individual scatterers in the patch. The resultant signal thus depends upon the relative amplitudes and phase angles of signals reflected from the individual scatterers in the patch. If the terrain patch contains no radar target, then the amplitudes of return from the various scatterers may be assumed to be substantially equal irrespective of changes in the magnetron transmitted frequency. However, changes in transmitted frequency produce changes in the relative phase angles of the scatterers, thus producing changes in the resultant signals received by horns 2 and 3. Over one cycle of frequency agility provided by oscillator 13, the apparent elevation angle of a given range interval will vary sinusoidally about a mean or average value which substantially corresponds to its true elevation angle.

The period of oscillator 13 is 4000 $\mu$sec. which corresponds to eight transmitted pulses. The range-gated filter is provided with a time constant of 8 μsec. so that each of the filter capacitors stores the average elevation angle over one cycle of modulation of oscillator 13.

However, if a ground patch contains a prominent radar target, which reflects a signal appreciably stronger than any other scatterer in the ground patch, then the sinusoidal variation in apparent elevation angle over one modulating cycle of oscillator 13 will be appreciably reduced. The difference between the output of phase detector 21 and the output of the range-gated filter for any given range interval over one modulating cycle of oscillator 13 is a measure of the clutter-to-signal ratio, where clutter is caused by reflections from scatterers in the ground patch and where signal reflections arise from significant radar targets. If the clutter-to-signal ratio is high and the ground patch contains no significant radar target, then a large sinusoidal difference signal will be applied to differential amplifier 30 over one modulating cycle of oscillator 13 for the given range interval. On the other hand, if the signals reflected from the scatterers are very small and the ground patch contains a prominent radar target, then a small sinusoidal difference signal will be applied to differential amplifier 30 over one modulating cycle of oscillator 13 for the given range interval.

The output from differential amplifier 30 for each transmitted pulse comprises the difference between instantaneous and average elevation angles for some 496 different range intervals. It is desired to determine those range intervals for which the fluctuation from the mean elevation angle of such intervals is appreciably reduced. The alternating output of differential amplifier 30 is subjected to full-wave rectification by crystals 37 and 38; and the average value of the full-wave rectified output across resistor 40 is stored in capacitor 43. Since the low-pass filter comprising resistor 42 and capacitor 43 has a time-constant of 10 μsec., the voltage stored in capacitor 43 is is the mean fluctuation magnitude over 10 range intervals of 1 μsec. each. This corresponds to the average fluctuation magnitude over a 0.93 mile length of terrain. Differential amplifier 48 provides a positive output whenever the instantaneous fluctuation across resistor 40 becomes less than that portion of the voltage across capacitor 43 appearing at the slider of potentiometer 45. This positive output triggers flip-flop 50. Conveniently potentiometer 45 may be adjusted to a setting of 50 percent.

Assuming for the moment that the output of differential amplifier 30 is sinusoid with a period of 10 μsec., the voltage stored in capacitor 43 will be $2/\pi = 0.636$ of the peak value of the sinusoid. Accordingly, with a slider setting of 50 percent, differential amplifier 48 will provide a positive output whenever the absolute magnitude of the assumed sinusoidal output of differential amplifier 30 decreases below 0.318 of its peak value.

In general, the output of differential amplifier 30 will be of an irregular waveform exhibiting discrete stepwise changes at intervals of 1 μsec. Hence, in general, differential amplifier 48 will provide positive outputs of only 1 μsec. duration; and accordingly, flip-flop 50 will usually provide output pulses of 1 μsec. duration. The delays provided by networks 52, 53 and 54 are precisely equal to the period between transmitted pulses from magnetron 11. Although the transmitted beam is sweeping in azimuth at the rate of 360° per second, the beam width of 2° causes any radar target to provide a large return for at least 11 transmitted pulses. If flip-flop 50 provides outputs during the same range interval for four successive transmitted pulses, then gate 56 will provide an output pulse corresponding to such range interval. It will be appreciated that along a range line containing no prominent radar target, flip-flop 50 may be triggered within a few range intervals merely because the rectified fluctuation across resistor 40 happens to be less than half the average fluctuation as represented by the signal at the slider of potentiometer 45. Upon the next transmitted pulse, because of the change in the transmitted frequency produced by oscillator 13, flip-flop 50 will again be triggered during various range intervals. But it is most unlikely that random terrain will cause flip-flop 50 to be triggered during the same range interval for two successive transmitted pulses. Only a prominent radar target will cause flip-flop 50 to be triggered during the same range interval for four successive transmitted pulses.

Assume a given range interval contains no prominent radar target, so that the fluctuation is substantially sinusoidal over one modulating cycle of oscillator 13. Since each modulating cycle of oscillator 13 comprises eight transmitted pulses, the provision of a four-input AND circuit 56 includes a full half cycle of modulation of oscillator 13. It is possible that for one or perhaps two of the transmitted pulses, the fluctuation signal from differential amplifier 30 will be less than the reference signal provided at the slider of potentiometer 45. However, it is certain that for at least two of the transmitted pulses, the fluctuation output of differential amplifier 30 will exceed the reference signal at the slider of potentiometer 45. Accordingly, AND circuit 56 cannot provide an output for any range interval which does not contain a prominent radar target.

The detection of small radar targets on the sea surface requires further discrimination and correlation because of the effects of wave action. The usual surface chop provides a substantially uniform or random distribution of scatterers. However, in higher sea states, the steeper slopes of waves in cresting and breaking seas create very strong local reflections lasting for periods of over half a second. Thus over a 1.5 milliseconds period of four successive transmitted pulses, such cresting and breaking seas may produce a transient effect for one azimuthal scan which is identical to that which would be produced by a prominent radar target. While sea clutter may correlate over the 1.5 milliseconds required for four transmitted pulses, it is unlikely that any correlation will exist over a period of 2 seconds for three successive azimuthal scans.

The output of AND circuit 56 is applied through summing resistor 59 to delay network 61. It will be noted that the time delay provided by network 61 is 500 μsec. less than the 1 second period of the azimuthal sweep provided by synchronous motor 4. In order to accommodate radial target velocities of up to 500 feet per second, multivibrator 67 stretches the 1 μsec. output pulses of AND circuit 56 to a duration of 3 μsec. The delay provided by network 70 is 1 μsec. less than 500 μsec.; and the total delay provided by networks 61 and 70 is 1 μsec. less than 1 second. Thus in the absence of any motion of a prominent radar target between two successive azimuthal scans, delay network 70 will provide an output pulse which commences 1 μsec. prior to and terminates 1 sec. subsequent to the 1 μsec. pulse provided by AND circuit 56. The delay provided by network 64 is 1 second. In order to accommodate a radial target velocity of 500 feet per second, which represents 1000 feet in 2 seconds, multivibrator 68 stretches the 1 μsec. output pulse of AND circuit 56 to a duration of 5 μsec. The delay provided by network 71 is 2 μsec. less than 500 μsec., and the total delay provided by networks 61, 64, and 71 is 2 μsec. less than 2 seconds. Thus in the absence of any motion of a prominent radar target during three successive azimuthal scans, delay network 71 will provide output pulses commencing 1 μsec. prior to and terminating 1 μsec. subsequent to the 3 μsec. pulse provided by delay network 70.

Tangential target motion is inherently accommodated provided it does exceed the 2° antenna beam width within the 2 seconds period for three successive azimuthal scans. A half-power beam width of 2° represents a half-amplitude beam width of 2.6°, so that a radar target should provide significant return for substantially 14 successive transmitted pulses. AND circuit 56 will provide an output for all but the first three pulses. Accordingly, AND circuit 56 provides an output for each of the last 11 of the 14 transmitted pulses. If there is no tangential target motion, then AND circuit 73 will also provide outputs for 11 successive transmitted pulses on the third and subsequent scans. If there is a radial target motion of 1° per second of 2° in 2 seconds, then AND circuit 73 will provide only one output pulse on the third and subsequent scans. If the direction of tangential target motion is the same as the direction of scan, then upon the third scan, AND circuit will provide a single coincidence output corresponding to the first pulse of the first scan from network 71, the fifth pulse of the second scan from network 70, and the eleventh pulse of the third scan from AND circuit 56. If the direction of tangential target motion is opposite to the direction of scan, then upon the third scan, AND circuit will provide a single coincidence output corresponding to the 11th pulse of the first scan from network 71, the fifth pulse of the second scan from network 70, and the first pulse of the third scan from AND circuit 56.

Hence, AND circuit 73 will provide an output pulse corresponding to the range interval of a prominent radar target only if that target appears during three successive azimuthal scans. This enables discrimination against cresting and breaking waves which act as prominent radar targets for periods appreciably more than 1.5 milliseconds but appreciably less than 2 seconds.

In order to compensate for drift, networks 61 and 64 are continuously calibrated and adjusted to provide the correct time delay. Pulses from multivibrator 27 are coupled through summing resistor 58 to delay network 61. The time delay provided by network 61 is an integral multiple of the period between transmitted pulses. Any lack of synchronism between pulses provided at the outputs of multivibrator 27 and delay network 61 is detected by the pulse-time comparator 62, which effects minor adjustment of the delay provided by network 61 to maintain synchronism. Similarly, delay network 64 is adjusted by comparator 65 to provide synchronism between its output pulses and those of multivibrator 27, since the time delay is also an integral multiple of the period between transmitted pulses. It will be appreciated that time delay elements 61 and 64 may comprise storage tubes, recycling video tape recorders, or sonic delay devices preferably having multiple reflecting surfaces.

Amplifiers 15 and 16 preferably have sufficient gain that in the absence of any reflected signals, mere noise in the receiving channels will produce normal outputs from limiters 18 and 19. Over a smooth water surface, no radar return may be received from depression angles less than 60° to 85°, for example. In the absence of any radar return, phase detector 21 provides a random fluctuating output in accordance with phase differences between receiver noise of the two receiving channels. In the absence of radar return, the noise-to-signal ratio is very high; and differential amplifier 30 provides a large fluctuation output. Even the smallest of radar targets will produce a consistent and appreciable reduction in the output of differential amplifier 30 and thus cause an output from AND circuit 73.

Sea return is not uniform and varies with depression angle and azimuth according to wind and wave conditions. During a given range sweep, clutter will be received from nearer portions of the sea at higher depression angles, while no return may be received from more distant portions of the sea at reduced depression angles. During a given azimuthal scan, one portion of the sea at a given depression angle may provide no return while other portions of the sea at the same depression angle may provide clutter. My device functions equally well whether the elevation angle fluctuation output of differential amplifier 30 is caused by clutter return or by mere receiver noise in the absence of any radar return. Thus I may detect radar targets against a background of either clutter return or mere receiver noise with equal facility.

It will be seen that I have accomplished the objects of my invention. My device detects radar targets and discriminates against ground clutter, especially from high sea states. I may detect objects as small as a half-pint fruit juice can floating amidst waves on a windblown water surface.

It will be understood that certain features and subcombinations are of utility and may be employed without reference to other features and subcombinations. It will be further understood that various changes in detail may be made without departing from the spirit of my invention.

Having thus described my invention, what I claim is:

1. A radar target detection device including in combination means including a phase interferometer radar system for providing a first signal in accordance with the instantaneous elevation angle of terrain along an azimuth line, a range-gated filter, means coupling the signal to the gated filter, first comparing means responsive to the first signal and to the gated filter for providing a second signal, and means responsive to a reduction in magnitude of the second signal for indicating the presence of a target.

2. A device as in claim 1 in which the indicating means comprises means for rectifying the second signal, low-pass filtering means responsive to the rectifying means, and second comparing means responsive to the rectifying means and to the low-pass filtering means.

3. A device as in claim 1 in which the indicating means comprises full-wave rectifying means providing a first output in response to the second signal, low-pass filtering means providing a second output in response to the rectifying means, and means for comparing the first output with a predetermined portion of the second output.

4. A device as in claim 1 in which the radar system transmits pulses at periodic intervals, wherein the indicating means comprises means providing a time delay equal to the period between successively transmitted pulses, means responsive to the second signal for exciting the time delay means, and a coincidence circuit responsive to the exciting means and to the time delay means.

5. A device as in claim 1 in which the radar system transmits pulses at periodic intervals, wherein the indicating means comprises a plurality of serially connected circuits each providing a time delay equal to the period between successively transmitted pulses, means responsive to the second signal for exciting the first of the serially connected time delay circuits, and a coincidence circuit responsive to each of the time delay circuits and to the exciting means.

6. A device as in claim 1 in which the radar system transmits pulses at periodic intervals, wherein the indicating means comprises means for correlating reductions in magnitude of the second signal over a plurality of transmitted pulses, and means responsive to the correlating means for indicating the presence of only those targets which consistently reduce the magnitude of the second signal.

7. A device as in claim 1 in which the radar system includes means for scanning in azimuth wherein the indicating means comprises means for correlating reductions in magnitude of the second signal over a plurality of azimuthal scans, and means responsive to the correlating means for indicating the presence of only those targets which consistently reduce the magnitude of the second signal.

8. A device as in claim 1 in which the radar system includes means for scanning in azimuth, the scanning means having a certain period, wherein the indicating means comprises means providing a time delay slightly less than the period between successive azimuthal scans, means responsive to the second signal for providing output pulses, a control circuit comprising a pulse-stretching circuit connected in series with the time delay means, means coupling the output pulses to the control circuit, and a coincidence circuit responsive to the output pulses and to the control circuit.

9. A device as in claim 1 in which the radar system includes means for scanning in azimuth, the scanning means having a certain period, wherein the indicating means comprises means providing a first time delay slightly less than the period between successive azimuthal scans, means providing a second time delay substantially equal to twice the first rime delay, means responsive to the second signal for providing output pulses, a first pulse-stretching circuit, a second pulse-stretching circuit producing a pulse of somewhat less than twice the duration of that provided by the first stretching circuit, a first control circuit including the first stretching circuit connected in series with the first delay means, a second control circuit including the second stretching circuit connected in series with the second delay means, means coupling the output pulses to the first and second control circuits, and a coincidence circuit responsive to the output pulses and to the first and second control circuits.

10. A device as in claim 1 in which the radar system transmits pulses and includes means for periodically varying the carrier frequency of the transmitted pulses.